United States Patent
Feulner et al.

(10) Patent No.: US 6,366,393 B1
(45) Date of Patent: Apr. 2, 2002

(54) FAST GAIN CONTROL FOR OPTICAL AMPLIFIERS

(75) Inventors: Matthias Richard Feulner, Nuremberg (DE); Guido Hermann Hunziker, Highlands, NJ (US); Bernd Teichmann, Eckental; Dieter Werner, Eriangen, both of (DE); Jianhui Zhou, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/382,853

(22) Filed: Aug. 25, 1999

(51) Int. Cl.[7] ................................................. H01S 3/00
(52) U.S. Cl. ..................................... 359/337; 359/341.3
(58) Field of Search ................................. 359/333, 337, 359/341, 345; 372/38.06

(56) References Cited

U.S. PATENT DOCUMENTS

| | | | |
|---|---|---|---|
| 4,918,396 A | | 4/1990 | Halemane .................... 330/4.3 |
| 4,954,786 A | | 9/1990 | Yamakawa ................... 330/4.3 |
| 5,088,095 A | | 2/1992 | Zirngibl .......................... 372/6 |
| 5,117,196 A | | 5/1992 | Epworth ...................... 359/333 |
| 5,245,690 A | | 9/1993 | Aida ............................. 385/142 |
| 5,278,640 A | * | 1/1994 | Aizu et al. ................... 358/527 |
| 5,299,055 A | * | 3/1994 | Yoneyama ................... 359/341 |
| 5,396,360 A | * | 3/1995 | Majima ........................ 359/133 |
| 5,442,479 A | * | 8/1995 | Biilow et al. ................ 359/341 |
| 5,506,724 A | * | 4/1996 | Shimizu et al. ............. 359/341 |
| 5,521,753 A | * | 5/1996 | Fake et al. ................... 359/341 |
| 5,600,481 A | * | 2/1997 | Nakabayashi ................ 359/341 |
| 5,664,131 A | * | 9/1997 | Sugiya ......................... 359/341 |

(List continued on next page.)

FOREIGN PATENT DOCUMENTS

| WO | WO 98 11682 | 3/1998 | ........... H04B/10/17 |
|---|---|---|---|
| WO | WO 00 04656 | 1/2000 | ........... H04B/10/17 |

OTHER PUBLICATIONS

Richards, D. H. et al., "A Theoretical Investigation of Dynamic All–Optical Automatic Gain Control in Multichannel EDFA's and EDFA Cascades", *IEEE J. of Selected Topics in Quantum Electrons*, vol. 3, No. 4, 8/97, pp. 1027–1036.

Sun, Y. et al, "Fast power transients in WDM optical networks with cascaded EDFAs", *Electronics Letters*, vol. 33, No. 4, Feb. 13, 1997, pp. 313–314.

Srivastava, A. K. et al., "Fast–Link Control Protection of Surviving Channels in Multiwavelength Optical Networks", *IEEE Photonics Technology Letters*, vol. 9, No. 12, 12/97, pp. 1167–1669.

(List continued on next page.)

*Primary Examiner*—Thomas H. Tarcza
*Assistant Examiner*—Deandra M. Hughes
(74) *Attorney, Agent, or Firm*—Gregory J. Murgia

(57) ABSTRACT

In an optically amplified wavelength division multiplexed (WDM) system having a WDM signal comprising a plurality of optical channels, the per-channel gain of the optical channels is kept relatively constant despite changes in input power at the optical amplifier, such as when individual optical channels of the WDM signal are added and dropped. More specifically, gain of an optical amplifier is controlled by controlling the amount of pump power supplied to the optical amplifier as a function of changes in input power which are measured in a feed-forward monitoring path. The amount of pump power for effecting gain control is adjusted according to a scaled relationship to the measured input power of the optical amplifier. By controlling the pump power directly in response to changes in input power, gain of the optical amplifier can be controlled within a sub-microsecond time scale from the time that a change in input power is detected. Moreover, by maintaining relatively constant per-channel gain in an amplified WDM signal despite changes in input power at the optical amplifier, power excursions are substantially reduced in surviving optical channels of the WDM signal, i.e., those at the output of the optical amplifier.

30 Claims, 7 Drawing Sheets

U.S. PATENT DOCUMENTS

| | | | | |
|---|---|---|---|---|
| 5,710,660 A | * | 1/1998 | Yamamoto et al. | 359/341 |
| 5,745,283 A | * | 4/1998 | Inagaki et al. | 359/341 |
| 5,760,949 A | * | 6/1998 | Motoshima et al. | 359/341 |
| 5,764,406 A | * | 6/1998 | Newhouse et al. | 359/341 |
| 5,815,299 A | * | 9/1998 | Bayart et al. | 359/171 |
| 5,818,629 A | * | 10/1998 | Kinoshita | 359/341 |
| 5,838,488 A | | 11/1998 | Kobayashi | 359/341 |
| 5,889,610 A | * | 3/1999 | Fatehi et al. | 359/341 |
| 5,900,968 A | | 5/1999 | Srivastava | 359/341 |
| 5,907,429 A | * | 5/1999 | Sugata | 359/341 |
| 5,966,236 A | * | 10/1999 | Okuno | 359/337 |
| 5,995,274 A | * | 11/1999 | Sugaya et al. | 359/337 |
| 6,038,061 A | * | 3/2000 | Sugaya | 359/337 |
| 6,064,515 A | * | 5/2000 | Yang | 359/341 |
| 6,067,187 A | * | 5/2000 | Onaka et al. | 359/341 |
| 6,029,154 A | * | 7/2000 | Yoon | 359/341 |

OTHER PUBLICATIONS

Suzuki, H., "Dynamic Gain Control by Maximum Signal Power Channel in Optical Linear Repeaters for WDM Photonic Transport Networks", *IEEE Photonics Technology Letters*, vol. 10, No. 5, May 1998, pp. 734–736.

Richards, D. H. et al., "Multichannel EDFA Chain Control: A Comparison of Two All–Optical Approaches", *IEEE Photonics Technology Letters*, vol. 10, No. 1, Jan. 1998, pp. 156–158.

Srivastava, A. K. et al., "EDFA Transient Response to Channel Loss in WDM Transmission System", *IEEE Photonics Technology Letters*, vol. 9, No. 3, Mar. 1997, pp. 386–388.

Giles, C. R. et al., "Transient gain and cross talk in erbium–doped fiber amplifiers", *Optical Letters*, vol. 14, No. 16, Aug. 15, 1989, pp. 880–882.

Sun, Y. et al., Optical Fiber Amplifiers for WDM Optical Networks, *Bell Labs Tchnical Journal*, vol. 4, No. 1, Jan.–Mar. 1999, pp. 187–206.

Park, S. Y. et al, A gain–flattened two–stage EDFA For WDM optical networks with a fast link control channel., *Optics Communications*, 153 (1998), pp. 23–26.

Y. Sun, A.K. Srivastava, J. Zhou, J. W. Sulhoff, 'Optical Fiber Amplifiers for WDM Optical Networks', Bell Labs Technical Journal, Jan.–Mar. 1999.*

S.Y. Park, H.K. Kim, S.M. Kang, G.Y. Lyu, H.J. Lee, J.H. Lee, S.–Y Kim, 'A gain–flattened two–stage EDFA for WDM optical networks with a fast link control channel', Optical Communications 153 (1998), pp. 23–26.*

A.K. Srivastava et al., 'Fast–Link Control Protection of Surviving Channels in Multiwavelenght Optical Networks', IEEE Photonics Technology Letters, vol. 9, No. 12, jpp. 1667–1669.*

S.Y. Park, H.K. Kim, C.S. Park, S.–Y Shin, 'Doped fibre lenght and pump power of gain–flattened EDFAs', Electronics Letters, vol. 32, No. 23, pp. 2161–2162.*

* cited by examiner

FAST GAIN CONTROL FOR OPTICAL AMPLIFIERS

TECHNICAL FIELD

The invention relates generally to lightwave communication systems and, more particularly, to gain control for optical amplifiers used in such lightwave communication systems.

BACKGROUND OF THE INVENTION

To meet the increasing demands for more bandwidth and higher data rates in today's networks, wavelength division multiplexing (WDM) is being used extensively in long haul optical transmission systems and is being contemplated for use in short haul applications, such as metropolitan area networks and the like. As is well known, WDM combines many optical channels each at a different wavelength for simultaneous transmission as a composite optical signal in a single optical fiber.

Optical amplifiers are commonly used in lightwave communication systems as in-line amplifiers for boosting signal levels to compensate for losses in a transmission path, as power amplifiers for increasing transmitter power, and as pre-amplifiers for boosting signal levels before receivers. In WDM systems, optical amplifiers are particularly useful because of their ability to amplify many optical channels simultaneously. Rare earth-doped fiber optical amplifiers, such as erbium-doped fiber amplifiers, are predominantly used in WDM systems, although other types of optical amplifiers such as semiconductor optical amplifiers may also find use in such systems.

In an optically amplified VDM system, signal power excursions in the WDM signal can be a significant problem. Signal power excursions may arise as a result of adding or dropping optical channels, network reconfigurations, failures or recovery from failures, and so on. As used hereinafter, surviving optical channels are meant to refer to those optical channels that are still present in the WDM signal after an add/drop has occurred. For example, adding or dropping individual channels of a WDM signal may cause changes in input power, which in turn results in changes in gain as well as fluctuations of power levels in surviving optical channels. Stated otherwise, because the output power of an optical amplifier does not react accordingly to the changes in input power, the optical power per surviving channel will fluctuate. Using an uncontrolled optical amplifier as an example, when 4 out of 8 channels in a WDM signal are dropped, the power in each surviving channel then increases toward double its original channel power in order to conserve the saturated amplifier output power. This increased gain per channel and increase in power per channel can lead to transmission stabilization problems, unacceptable bit error ratio degradation if power variations are not within the dynamic range of receiver detection equipment, as well as other power-related problems. For example, surviving channels may experience errors when channels are dropped because the power in the surviving channels may exceed thresholds for nonlinear effects, such as Brillouin scattering. Surviving channels may also experience errors when channels are added, thus leading to optical signal to noise ratio (OSNR) degradation or even more severe impairments if power in surviving channels is depressed below the sensitivity thresholds at the receiver.

Additionally, because gain of an optical amplifier cannot be controlled fast enough in prior control schemes in response to changes in input power, power spikes may occur in the total output power of the optical amplifier. Power spikes will also occur in the total output power of an uncontrolled optical amplifier as well. These power spikes can adversely affect system performance, e.g., by degrading bit error ratio performance, by damaging receiver components if the power levels exceed thresholds, and so on. As can be expected, changes in input power and resulting gain fluctuations are especially problematic for systems in which a large amount of traffic is added and dropped, e.g., metropolitan area networks, systems employing wavelength add/drop multiplexers or optical cross connects, and so on.

Many different gain control schemes have been proposed for controlling signal power excursions or transients. Some gain control schemes employ a feedback loop to control the amount of pump power supplied to the optical amplifier based on measurements of the total output power of the optical amplifier. However, this method of gain control is not fast enough to respond to the sudden changes in power at the input of the optical amplifier. Similarly, some have proposed feed-forward compensation using a low-frequency control loop as well as software-based gain control schemes. In each of the cases, a gain control scheme has not yet been demonstrated which has fast enough response times for limiting surviving channel power excursions as a function of the input power variations. Gain clamping is another well-known technique, but inefficient pump power usage is a known problem with gain-clamped optical amplifiers.

SUMMARY OF THE INVENTION

In an optically amplified wavelength division multiplexed (WDM) system having a WDM signal comprising a plurality of optical channels, the per-channel gain of the optical channels is kept relatively constant despite changes in input power at the optical amplifier, such as when individual optical channels of the WDM signal are added and dropped. More specifically, gain of an optical amplifier is controlled in a feed-forward based control scheme by controlling the amount of pump power supplied to the optical amplifier as a function of changes in measured optical input power which are measured in a feed-forward monitoring path. The amount of pump power for effecting gain control is adjusted according to a scaled relationship to the measured input power of the optical amplifier. By controlling the pump power directly in response to changes in input power, gain of the optical amplifier in one exemplary embodiment can be controlled on a sub-microsecond time scale from the time that a change in input power is detected. As such, gain control can be effected before changes in input power reach the gain medium of the optical amplifier. Moreover, by maintaining relatively constant per-channel gain in an amplified WDM signal despite changes in input power at the optical amplifier, power excursions are substantially reduced in surviving optical channels of the WDM signal, i.e., those at the output of the optical amplifier.

In one illustrative embodiment, a WDM system includes at least one erbium-doped optical amplifier for amplifying a WDM signal having a plurality of optical channels. The optical amplifier is coupled to and receives pump light from a pump source. At a position upstream from the optical amplifier input, the WDM signal is coupled via a feed-forward monitoring path to an optical monitoring arrangement which detects and measures the total input power of the WDM signal. In response to fast changes in input power (e.g., add/drop, failure, etc.), control circuitry coupled to the pump source controls the amount of pump power being supplied to the optical amplifier. As a result, gain is controlled before changes in input power reach the optical amplifier gain medium such that power levels of surviving optical channels will experience minimal power excursions despite changes in input power. For example, the power of a surviving channel at the output of the optical amplifier is relatively constant regardless of how many channels and how much power is supplied at the input of the optical amplifier. Of course, input power must remain within certain boundaries for reasons relating to device and system stability, physics, and so on.

Fast gain control can be achieved according to the principles of the invention when new optical channels are added to or dropped from the WDM signal, in the presence of failures or recovery from failures, e.g., transmitter failure, when channels are re-routed such as in cross-connects, and so on.

BRIEF DESCRIPTION OF THE DRAWING

A more complete understanding of the present invention may be obtained from consideration of the following detailed description of the invention in conjunction with the drawing in which.

DETAILED DESCRIPTION OF THE INVENTION

Although the illustrative embodiments described herein are particularly well-suited for use in a wavelength division multiplexed system (WDM) comprising rare earth-doped fiber optical amplifiers such as erbium-doped fiber amplifiers, and shall be described in this exemplary context, those skilled in the art will understand from the teachings herein that the principles of the invention may also be employed in conjunction with other types of optical communication systems and other types of optical amplifiers and amplifier pumping arrangements. Accordingly, the embodiments shown and described herein are only meant to be illustrative and not limiting.

Figure 1:
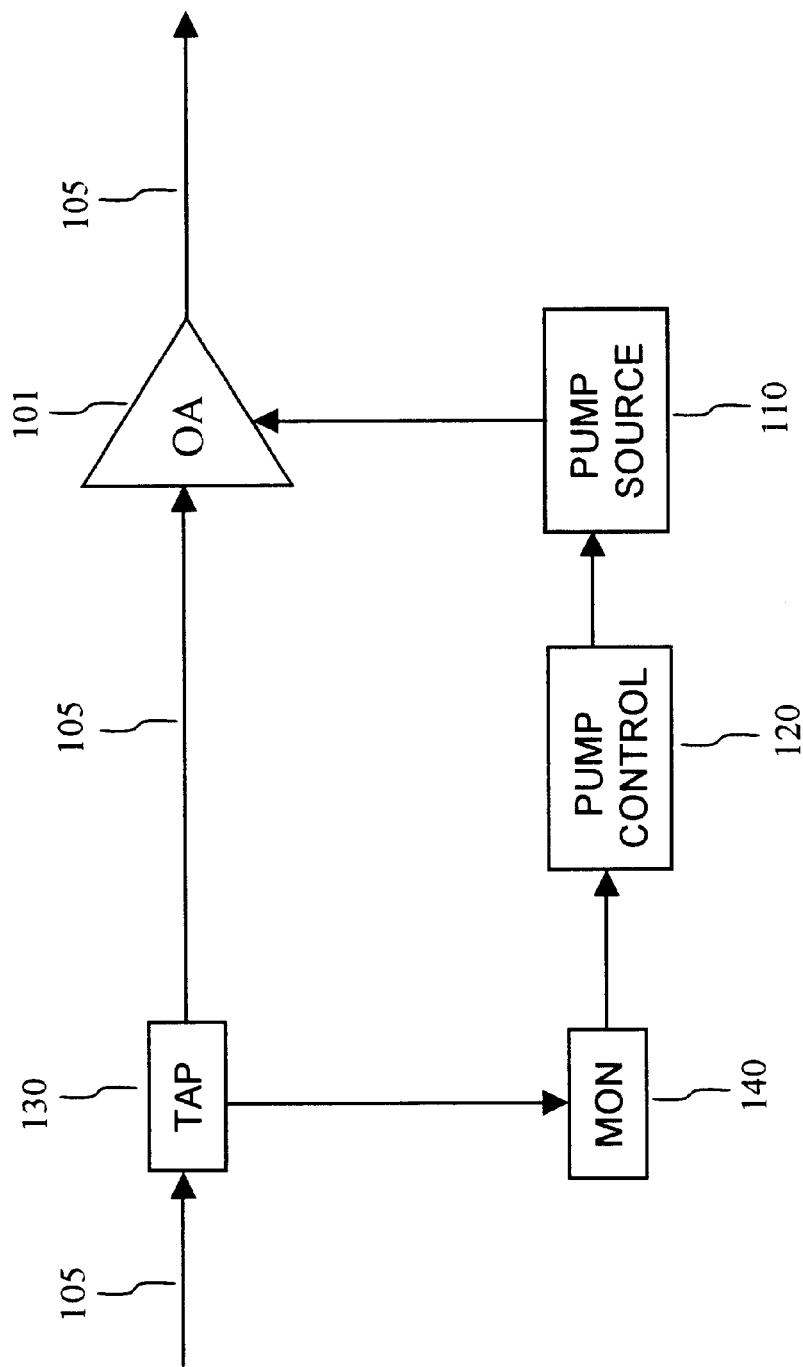
FIG. 1 is a simplified block diagram of an exemplary embodiment of the invention.

FIG. 1 shows a simplified block diagram illustrating the basic principles of the invention. Briefly, optical amplifier 101 is coupled to optical fiber 105 for receiving a WDM signal comprising individual optical channels where each channel is associated with a particular wavelength. In one exemplary embodiment, optical amplifier 101 can be a rare earth-doped fiber optical amplifier such as an erbium-doped fiber amplifier. Pump source 110 is used in a conventional manner to supply pump power to excite the gain medium of optical amplifier 101 for amplifying the WDM signal provided as input to optical amplifier 101. Pump source 110 can be a semiconductor laser pump assembly, such as a laser diode pump, or any other suitable pump source known in the art. Various types of optical amplifiers and pumping arrangements are well-known to those skilled in the art.

According to the principles of the invention, pump control 120 is used for controlling the amount of pump power supplied by pump source 110. By changing the amount of pump power, the amount of gain provided by optical amplifier 101 is therefore controlled. In the embodiment shown in FIG. 1, gain control is effected as a function of monitored input power to optical amplifier 101. More specifically, optical tap 130 taps or otherwise couples a portion of the optical signal power from optical fiber 105 to optical monitor 140. Optical monitor 140 measures the amount of input power in the tapped WDM signal and supplies this measurement to pump control 120. As shown, optical tap 130 and optical monitor 140 form a feed-forward path such that the gain of the optical amplifier can be kept constant as the pump power varies as a function of input power changes in the WDM signal. As previously mentioned, input power changes may occur, for example, when individual optical channels are added and dropped from the WDM signal.

Figure 2:
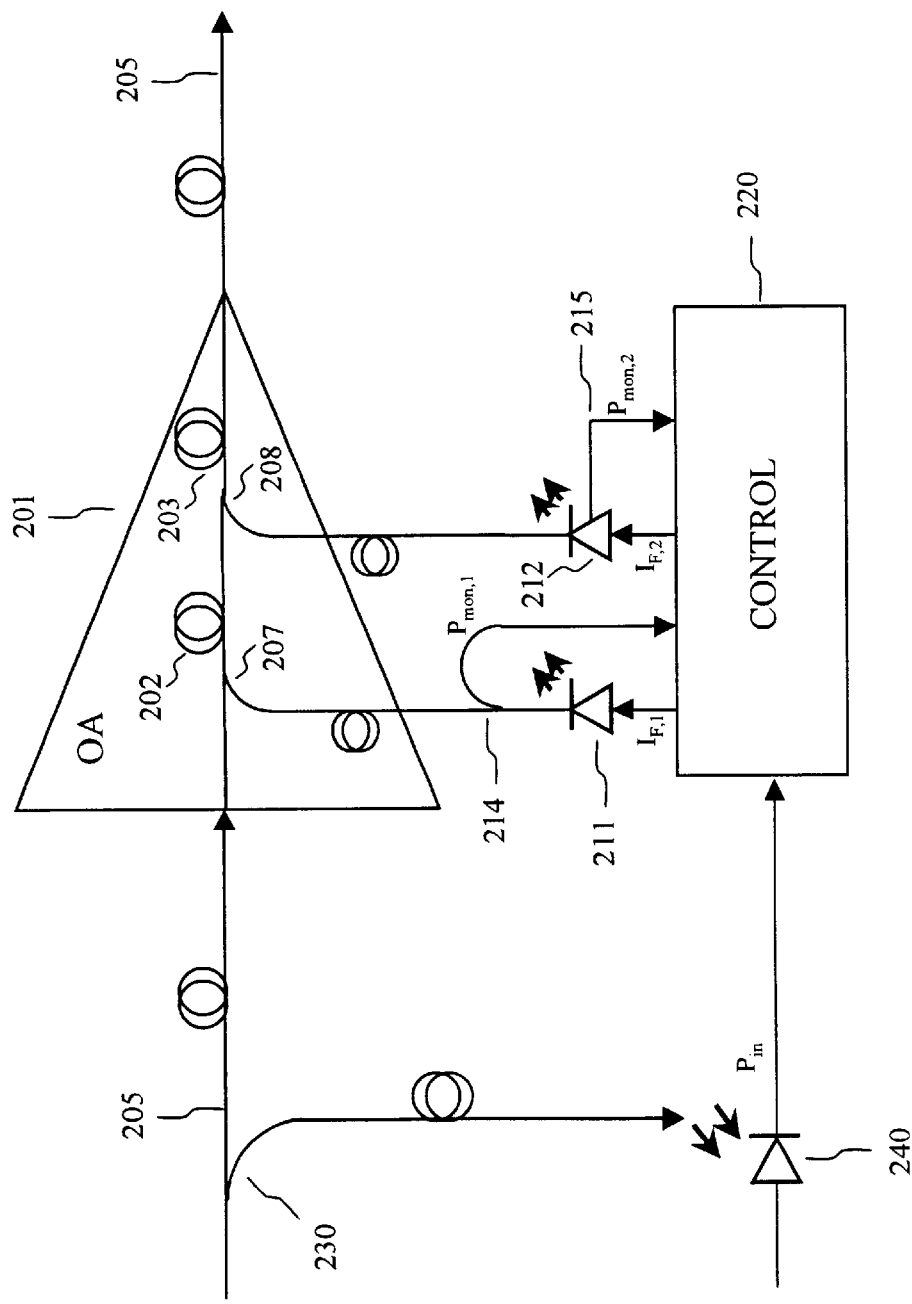
FIG. 2 is a simplified schematic diagram of an exemplary embodiment of the invention.

FIG. 2 shows a more detailed schematic diagram of the elements which were shown and described in FIG. 1. More specifically, optical amplifier 201 is shown in this exemplary embodiment to be a two-stage optical amplifier having first stage 202 and second stage 203. Two-stage optical amplifiers are well-known to those skilled in the art. It should be noted, however, that the principles of the invention can also be applied in single stage or other multi-stage amplifier arrangements. FIG. 2 shows a conventional forward pumping arrangement for a two-stage optical amplifier in which a first pump source 211 is used for supplying pump light to first amplifier stage 202 and second pump source 212 is used for supplying pump light to second amplifier stage 203, both in a co-propagating direction, i.e., in the same direction of propagation as the signal light. Other pumping arrangements will be described in more detail below, e.g., backward (counter-propagating) pumping arrangements, hybrid pumping arrangements, and so on. Pump sources 211 and 212 can be implemented using well-known components, e.g., laser diodes or other suitable optical sources, for supplying pump light into optical fiber 205 to excite the gain medium (e.g., rare earth dopant) of first and second amplifier stages 202 and 203, respectively, so as to amplify the WDM optical signal incident on optical fiber 205.

In one exemplary embodiment, first amplifier stage 202 may be pumped using a 980 nm wavelength pump source 211 while second amplifier stage 203 may be pumped using a 1480 nm wavelength pump source 212. This arrangement and selection of pump wavelengths is well-known and is only meant to be illustrative and not limiting in any way since other pump arrangements and pump wavelengths can also be used. Continuing with the embodiment shown in FIG. 2, pump light is coupled to first and second amplifier stages 202 and 203 using conventional wavelength selective couplers 207 and 208, respectively. FIG. 2 also shows a conventional pump monitoring arrangement for each of pump sources 211 and 212. More specifically, the output of pump source 211 is shown here as being monitored using a well-known front coupler detection technique facilitated by coupler 214. The output power of pump source 211, represented here as $P_{mon,1}$, is coupled to control element 220 which will be described in more detail below. The output of pump source 212 is shown here as being monitored using a well-known back facet detection technique facilitated by the back facet of the laser diode which is being used as pump source 212. Similarly, the output power of pump source 212, represented here as $P_{mon,2}$, is coupled to control element 220 which will also be described in more detail below. It should be noted that the pump monitoring arrangements shown and described herein are only meant to be illustrative and not limiting in any way.

Coupler 230 is used to tap off a fractional amount of the input power of the WDM signal which is propagating along optical fiber 205. Coupler 230 can be any well-known device for tapping off a portion of the optical signal energy, such as a fractional 98/2 coupler which is commercially available from many component suppliers. The tapped portion of the input signal is then detected by photodetector 240, which again can be any well-known device for converting optical signal energy to a corresponding electrical signal for appropriate detection of optical signal power. Importantly, photodetector 240 is used according to the principles of the invention to detect and measure the total input power of the WDM signal which is being supplied as input to optical amplifier 201.

The total input power detected by photodetector 240 is supplied as an electrical input to control element 220 so that appropriate gain control can be effected for optical amplifier 201. Control element 220 includes control circuitry that is responsive to the detected total input power $P_{IN}$ for generating appropriate pump drive currents for each of pump sources 211 and 212. In particular, control element 220 supplies electrical drive current $I_{F,1}$ for driving pump source 211 to deliver an appropriate amount of pump power to first amplifier stage 202. Similarly, control element supplies electrical drive current $I_{F,2}$ for driving pump source 212 to deliver an appropriate amount of pump power to second amplifier stage 203.

Because gain control according to the principles of the invention is based on feed-forward control, calculating the appropriate amount of pump power to effect gain control is therefore based on the measured input power without knowing the optical output power. For small changes in input power, output power is substantially a linear function of pump power injected into the amplifier. However, this linearity may not exist when there are larger changes in input power, e.g., larger power transients. For example, consider a 40-channel system. With relatively low optical input power (e.g., when 4 channels are present), the amount of noise generated can be higher as compared to when optical input power is relatively high (e.g., when fully loaded with 40 channels present). Therefore, when there is a large drop in input power (e.g., when surviving channel count drops from 40 to 4 channels), more pump power may be required because of the increased effect of noise on the fewer channels and lower input power.

In one exemplary embodiment, we have discovered that the appropriate amount of pump power $P_{PUMP}$ for achieving the desired gain can be calculated as a function of input power $P_{IN}$ according to the following relationship: $P_{PUMP} = C_1 + (C_2 \times P_{IN})$, where $C_1$ and $C_2$ are coefficients which will be described in further detail below. For a two-stage optical amplifier, such as optical amplifier 201 in FIG. 2, it is contemplated in this embodiment that there would be two sets of coefficients, one for each of the stages. As such, the notation for the coefficients is represented as $C_{i,j}$, where i represents the optical amplifier stage (e.g., first stage 202 or second stage 203) and j represents the particular coefficient. In this example, $C_{1,1}$ therefore corresponds to the first coefficient for the first optical amplifier stage 202, $C_{1,2}$ corresponds to the second coefficient for stage 202, $C_{2,1}$ corresponds to the first coefficient for the second optical amplifier stage 203, and $C_{2,2}$ corresponds to the second coefficient for stage 203. It should be noted that this example is meant to be illustrative and not limiting since other modifications will be apparent to those skilled in the art, e.g., one set of coefficients for both stages, and so on.

Figure 3:
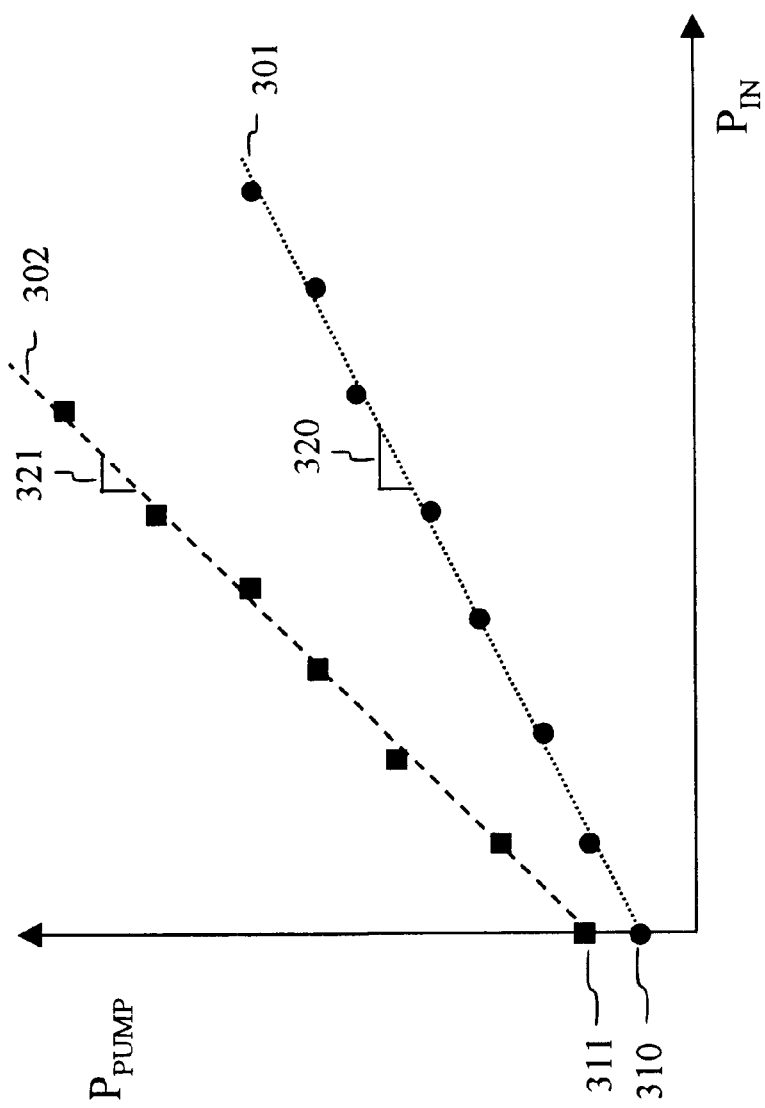
FIG. 3 shows a plot of pump power as a function of input power helpful in understanding the principles of the invention.

FIG. 3 shows an exemplary plot of pump power $P_{PUMP}$ for a single amplifier stage as a function of input power $P_{IN}$, which can be used to derive coefficients $C_{i,j}$ according to the principles of the invention. As shown, lines 301 and 302 represent two sets of traces of pump power $P_{PUMP}$ versus $P_{IN}$ for a single amplifier stage at two different operating conditions. For example, line 301 could represent plots of $P_{PUMP}$ versus $P_{IN}$ for a first gain level, e.g., 20 dB, and line 302 could represent plots of $P_{PUMP}$ versus $P_{IN}$ for a second gain level, e.g., 23 dB. It should be noted that the number of traces and the particular gain values associated with each trace shown in FIG. 3 are only meant to be illustrative and not limiting in any way. For example, only two traces are shown here for simplicity of illustration and explanation. To derive traces, for example, one could select a particular gain value, e.g., 20 dB for line trace 301, and then measure the amount of pump power $P_{PUMP}$ required to achieve that gain at various values of input power $P_{IN}$. The result would be a series of points, e.g., shown here along lines 301 and 302. It should be noted that the particular gain values selected for the traces are a matter of design choice and may be based on such factors as type of optical amplifier, desired system performance, and so on.

Coefficients $C_{i,j}$ are then derived from traces 301 and 302. In particular, we have discovered that a first coefficient, $C_{n,1}$, should represent a direct offset to the output of the pump laser, i.e., $P_{PUMP}$, at lower input power $P_{IN}$ levels. In FIG. 3, $C_{n,1}$ is measured as shown at points 310 and 311 (i.e., at the point of intersection with the y-axis) for lines 301 and 302, respectively. As such, $C_{n,1}$ becomes the dominant coefficient at lower input power $P_{IN}$ levels. We have also discovered that using a second coefficient $C_{n,2}$ as a slope factor can be effectively used to offset the pump power $P_{PUMP}$ at higher input power $P_{IN}$ levels. In FIG. 3, $Q_{n,2}$ is measured, for example, at points 320 and 321 for lines 301 and 302, respectively. As can be expected, $C_{n,2}$ becomes the dominant coefficient at higher input power $P_{IN}$ levels.

Figure 4:
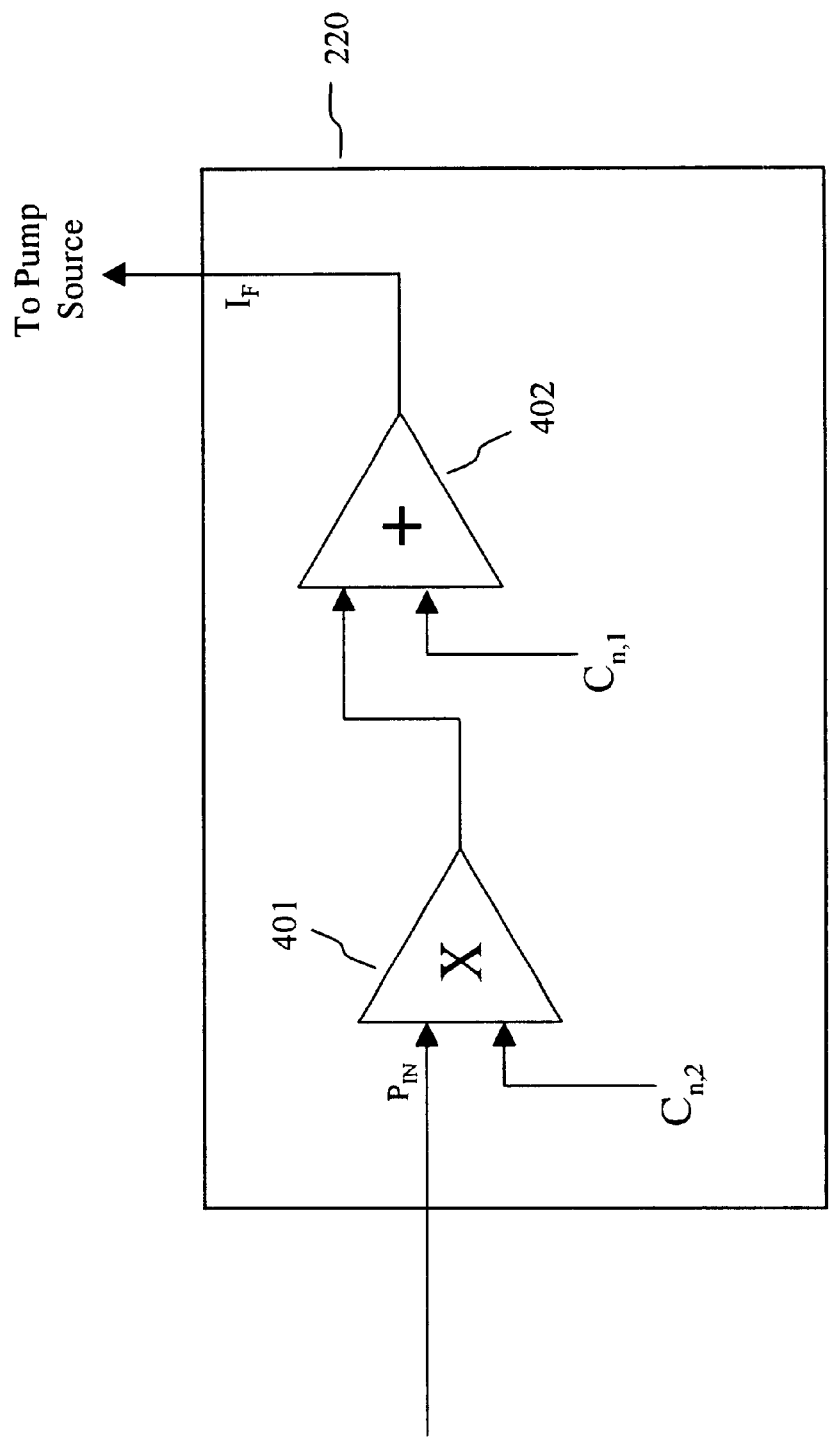
FIG. 4 is a simplified block diagram of one exemplary embodiment of the control circuitry shown in FIG. 2.

In one exemplary embodiment, the calculation of pump power using the relationship $P_{PUMP} = C_1 + (C_2 \times P_{IN})$ is carried out in hardware so that gain control can be realized on the order of sub-microseconds ($\mu$sec), e.g., much less than 1 $\mu$sec if required. The desired response time can also be based accordingly on system requirements. For example, some systems may allow for longer response times. However, the important aspect here is that gain can be controlled on a very fast, sub-microsecond basis if needed. That is, pump power can be changed to control the gain of the optical amplifier on a sub-microsecond time scale from the time that a change in input power is detected. One such hardware implementation is shown in FIG. 4. In particular, FIG. 4 shows a simplified block diagram of the operations carried out by circuitry in control element 220 for deriving the appropriate pump power according to the relationship $P_{PUMP} = C_1 + (C_2 \times P_{IN})$. Initially, coefficients C, can be defined based on the particular optical amplifier's characteristics and operating parameters.

While coefficients $C_{i,j}$ are used to determine the appropriate amount of pump power to be supplied by the pump source according to the gain control arrangement, it should be noted that there will be limits as to how much the pump power can be changed. For example, the minimum amount of pump power to be supplied by the pump source may be dictated by a threshold relating to the stability of the pump laser, for example. Similarly, a pump laser will have a maximum allowable output pump power based that may be dictated by some or all of the following: device requirements of the pump laser; optical amplifier requirements; system requirements; and so on.

It should also be noted that FIG. 4 represents a simplified diagram only and that control element 220 will include many other components for carrying out other control functions that are not within the scope of the present invention.

Multiplier circuitry 401 multiplies the total input power as measured by photodetector 240 (FIG.2) by the second pump power coefficient $C_{n,2}$, where n represents either the first or second stage depending on which pump source drive current is being calculated. The output of multiplier 401 is then added with the first pump power coefficient $C_{n,1}$ in adder circuitry 402. It should be noted that control element 220 can be implemented using well-known circuitry and techniques.

Figure 5:
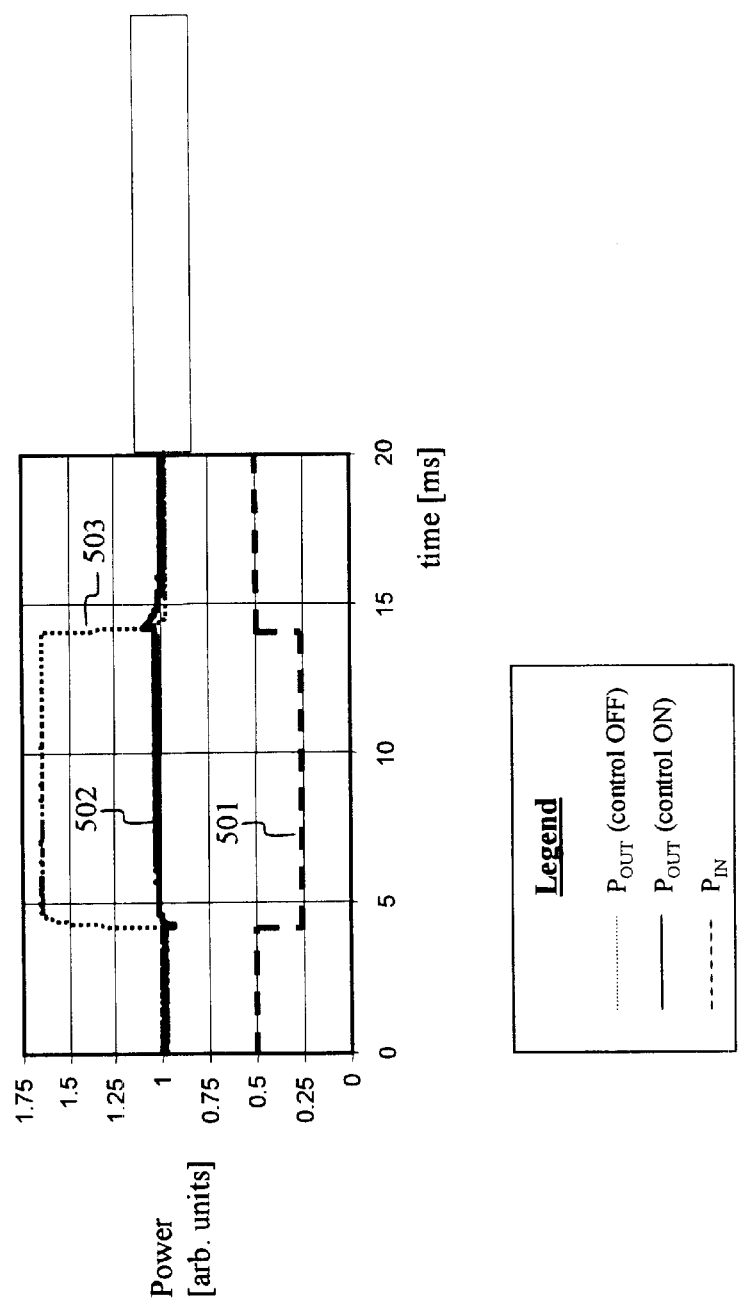
FIG. 5 shows a graphical plot of the power in a surviving optical channel helpful to understanding the principles of the invention.

FIG. 5 illustrates exemplary results achieved using the gain control scheme according to the principles of the invention. More specifically, FIG. 5 shows a plot of power of a surviving channel at the output of the optical amplifier as a function of time in response to input power changes. Trace 501 represents the input power level, trace 502 represents the power of a surviving channel at the optical amplifier output when the principles of the invention are applied, and trace 503 represents the power of the surviving channel at the optical amplifier output without the benefit of the invention. The example shown in FIG. 5 represents a time resolved reaction of the optical amplifier to a 3 dB change in input power (i.e., 50%) for a surviving channel having a wavelength of 1559.8 nm. However, this example is meant to be illustrative only. As illustrated by traces 501 and 503 and as previously described, when input power decreases, the power of a surviving channel will increase without the benefit of the control scheme of the present invention. As described, this increase in power in the surviving channel is undesirable for a number of reasons, e.g., power-dependent optical impairments such as stimulated brillioun scattering (SBS), higher bit error ratios, and so on. When gain control is implemented according to the principles of the invention, the power excursion in the surviving channel is substantially reduced as illustrated by trace 502.

FIG. 5 also illustrates the characteristic of the power change in the surviving channel at the moment when input power changes. As shown by trace 502, the power excursions are minimal at the moment in time that input power changes (trace 501). By contrast, the power change in surviving channels using prior schemes (e.g., gain clamping, software-based control, etc.), is typically characterized by spikes, oscillations, or other anomalies.

According to another aspect of the invention, the amount of pump power used for effecting gain control can be further adjusted or otherwise tuned on a periodic or event-driven basis. More specifically, operating targets for the hardware control circuitry (e.g., control element 220) that controls the pump power levels of the pump sources can be established, updated, refreshed, and maintained to account for such factors as: changes in channel count; optical amplifier efficiency (e.g., caused by optical amplifier aging, temperature-induced variations, etc.), other transmission impairments (e.g., span losses); and so on. In general, the fast gain control described in the preceding embodiments is intended for "fast" changes in input power, e.g., add/drop, failure conditions, and so on. On the other hand, the amount of pump power can also be adjusted based on "slow" changes driven by such factors as device aging, temperature, to name a few.

For example, it is well-known that the wavelength of a pump laser may change depending on temperature (e.g., chip temperature) absent some other stabilization (e.g. by a fiber Bragg grating). Although a laser chip is typically temperature stabilized, higher current through the laser chip will result in a higher internal temperature which in turn may result in a higher emission wavelength of the pump laser. Because the efficiency of an erbium-doped fiber amplifier depends on wavelength of the pump laser, a change in emission wavelength of the pump laser could effect the efficiency of the amplifier such that output power does not change on a one-for-one basis with the pump power, especially for large power transients. As such, pump power would need to be further adjusted to account for this effect.

Figure 6:
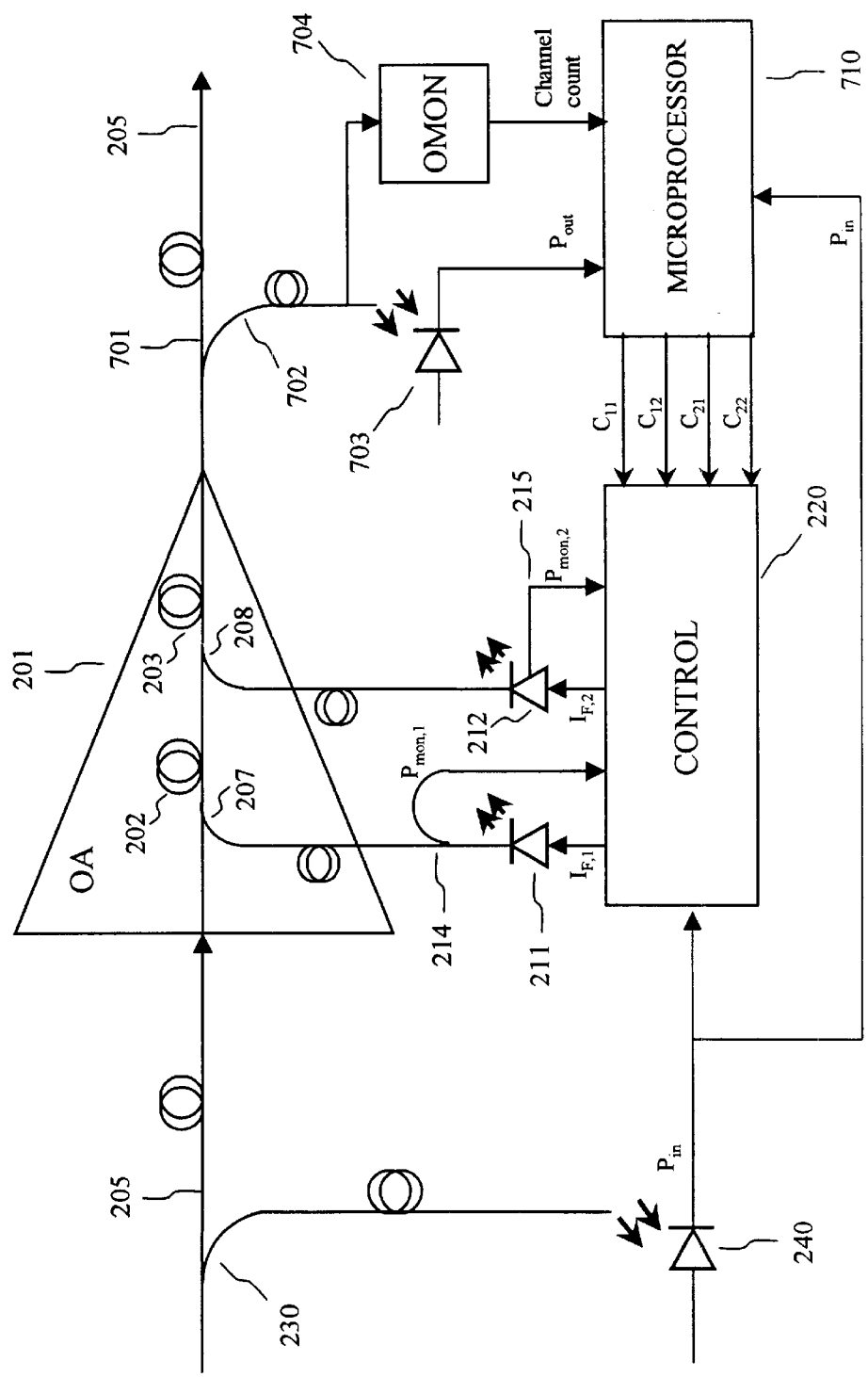
FIG. 6 is a simplified schematic diagram of another exemplary embodiment illustrating another aspect of the invention.

FIG. 6 shows one exemplary embodiment for controlling the pump power adjustments in view of the above considerations. For sake of brevity, the structure and function of elements shown in FIG. 6 which are the same as those previously described (e.g., FIG. 2) will not be repeated. As shown, output coupler 701, which can be any well-known fractional coupler or device having equivalent function, taps off a portion of the signal power supplied as output from amplifier 201. By way of example only, coupler 701 can be the so-called previously described 98/2 type coupler in which approximately 2% of the signal power in the WDM signal is tapped and directed to path 702. As shown, the tapped signal power is then directed to a conventional photodetector 703, the function of which is similar to that previously described for photodetector 240, except that photodetector 703 is used for detecting the total output power, $P_{OUT}$, of the tapped WDM signal. It should be noted, however, that although the basic principles of operation for photodetectors 240 and 703 are very similar, the performance requirements (and thus the particular device used in the system) may be very different. In particular, photodetector 240 has to react on a sub-microsecond time scale to the "fast" changes in input conditions, while photodetector 703 is measuring "slow" changes which may even be on the order of milliseconds or slower.

The tapped signal power from path 702 is also directed to an optical monitor (OMON) 704 which may derive, among other information, the number of optical channels in the WDM signal. Optical monitor 704 can also be implemented using various devices and techniques well-known to those skilled in the art. By way of example, an optical monitor 704 could include, among other elements, an optical spectrum analyzer (not shown) for deriving the number of optical channels.

The output from optical monitor 704 (e.g., channel count, noise power, etc.) and the output from photodetector 703 (e.g., measured total power out, $P_{OUT}$) are both supplied to microprocessor 710 for calculating the aforementioned pump power coefficients which are then provided to control element 220 as previously described for modifying the amount of pump power supplied by each of pump sources 211 and 212 according to the gain control scheme previously described. Again, the pump power coefficients are designated with the notation $C_{i,j}$, where $C_{1,1}$ corresponds to the first coefficient for the first optical amplifier stage 202, $C_{1,2}$ corresponds to the second coefficient for stage 202, $C_{2,1}$ corresponds to the first coefficient for the second optical amplifier stage 203, and $C_{2,2}$ corresponds to the second coefficient for stage 203. Microprocessor 710 also receives as input the total input power measured by photodetector 240 as previously described.

Figure 7:
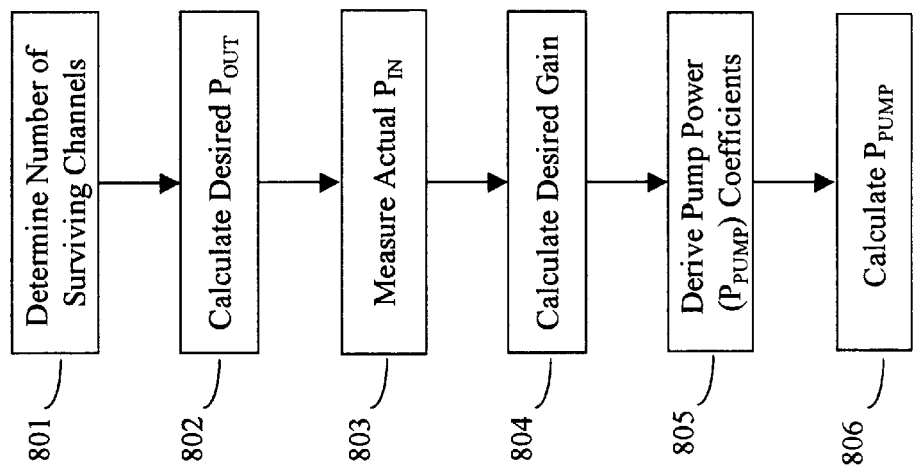
FIG. 7 is a flow diagram of the method steps for adjusting pump power according to another exemplary embodiment of the invention.

The simplified flowchart in FIG. 7 illustrates the steps involved in making adjustments to the amount of pump power used in the gain control scheme according to the principles of the invention. For simplicity of illustration and explanation, the steps shown in FIG. 7 will be described with reference to the embodiment shown in FIG. 6. It should be noted that the steps shown in FIG. 7 can be software-implemented and can be implemented on the order of milliseconds or even slower. In particular, the steps in FIG. 7 describe a procedure which can be used to adjust for the aforementioned "slow" changes. Moreover, the procedure set forth in FIG. 7 is intended as a procedure for "fine tuning" the per channel output power of the surviving channels since most of the correction will have already been accomplished as part of the fast gain control scheme described in the preceding embodiments.

In step 801, the number of surviving channels, N, in the WDM signal is determined by optical monitor 704 (FIG. 6). More specifically, the WDM signal was previously defined as having a plurality of optical channels. If individual optical channels are added and/or dropped from the WDM signal, e.g., at an add/drop node, then optical amplifier 201 (FIG. 6) will therefore only amplify those "surviving" channels. As such, the number of surviving channels can be determined at the output of optical amplifier 201 using optical monitor 704 (FIG. 6). It will be appreciated that other methods for determining the number of optical channels in a WDM signal will be apparent to those skilled in the art and are contemplated by the teachings herein.

Desired total output power, e.g., new value for the output power $P_{OUTNEW}$), of the WDM signal is then calculated in step 802 based on the number of surviving optical channels N in the WDM signal, i.e., channel count. As previously described, one goal of the invention is to control gain such that optical power is maintained at a constant level in the surviving optical channels even when optical channels are added and/or dropped from the WDM signal. For example, to maintain constant power levels in the surviving optical channels, the desired total output power of the WDM signal will be lower when the channel count drops, e.g., when channels are dropped, and higher when the channel count increases, e.g., when channels are added. Using the embodiment of FIG. 6 as an example, microprocessor 710 receives the actual total output power of the WDM signal via photodetector 703 and channel count information from optical monitor 704. If the actual total output power of the WDM signal obtained via photodetector 703 is not at a desired level based on the channel count obtained via monitor 704, e.g., it is too high or low given the number of channels, then microprocessor 710 calculates the new desired output power $P_{NEW}$ for the WDM signal.

In one exemplary embodiment, the desired total output power $P_{OUTNEW}$ is obtained by microprocessor 710 (e.g., from stored values in a lookup table) based on the number of channels, e.g., the channel count derived by optical monitor 704. In one exemplary embodiment, the stored values of $P_{OUTNEW}$ were calculated based on the desired per channel output power ($P_{CH}$) and channel count N, e.g., $P_{OUTNEW}=P_{CH} \times N$, as well as some noise contribution (especially in the case of a low channel count). As previously noted, one objective of the invention is to maintain relatively constant power on a per channel basis ($P_{CH}$) regardless of changes in input power. For example, the power of a surviving channel should be relatively constant regardless of the number of channels supplied at the input to the optical amplifier through add/drop operations.

It should be noted however, that variations in per channel power may be required under certain circumstances. As previously described, it is well-known that there might be pump laser stability problems when operated at low output power as in the case of low channel count. As such, it may be desirable to have a fixed lower pump power limit and subsequently a higher per channel output power level $P_{CH}$ when the channel count is very low. The desired pump laser output power limit will be apparent to those skilled in the art in view of system and component design parameters and other well known factors.

According to one exemplary embodiment, a change in per channel channel power, $P_{CH}$, will only be allowed below 4 channels (using the 40 channel system as an example) realized to a lower hardware limit to the pump lasers' output power. The ultimate goal in this exemplary system would be to maintain constant per channel output power in the range from 4 to 40 channels. For the case of 4 or more channels, additional noise contribution will be compensated by proper choice of coefficients $C_{i,j}$.

Returning to step 803 in FIG. 7, the total input power $P_{IN}$ to optical amplifier 201 (from FIG. 6), is measured as previously described in the preceding embodiments, such as by using photodetector 240. Using the measured total input power $P_{IN}$ from step 803 and the desired total output power $P_{NEW}$ from step 802, the desired gain, or new gain value $G_{NEW}$, is then calculated by microprocessor 710 as shown in step 804, wherein $G_{NEW}$=calculated $P_{NEW}$/measured $P_{IN}$. The new gain value $G_{NEW}$ will then correspond to an amount of gain that is appropriate given the actual number of surviving channels.

Steps 805 and 806 are carried out to derive an appropriate value for the amount of pump power, $P_{PUMP}$, that must be supplied to the optical amplifier in order to achieve the desired gain $G_{NEW}$. In particular, pump power coefficients $C_{i,j}$ are obtained in step 805 according to the technique previously described for the embodiment shown in FIG. 3-4. Pump power $P_{PUMP}$ is then calculated in step 806 by microprocessor 710 (FIG. 6) using the pump power coefficients and input power $P_{IN}$ according to the following relationship: $P_{PUMP}=C_1+(C_2 \times P_{IN})$.

In general, coefficients $C_{i,j}$ are used to compensate for the aforementioned problems which may warrant adjustment of the pump power, e.g., pump laser wavelength shift, amplifier noise, and so on. Consequently, by properly selecting values for coefficients $C_{i,j}$, the pump power generated by the pump laser to excite the optical amplifier's gain medium can be adjusted so that the amplifier's output power varies as a function of input power changes in order to maintain relatively constant power per channel in the surviving channels. Moreover, coefficients $C_{i,j}$ can also be updated periodically depending on the input and output conditions of the optical amplifier.

In one embodiment, values for coefficients $C_{i,j}$ can be stored in a lookup table and retrieved by microprocessor 710 (FIG. 6) in step 805 (FIG. 7) for subsequent calculations of pump power $P_{PUMP}$ in step 806 (FIG. 7). For example, pump power coefficients $C_{i,j}$ derived from traces 301 and 302 (FIG. 3) can be stored as shown in Table 1:

TABLE 1

| Gain | $C_{1,1}$ | $C_{1,2}$ | $C_{2,1}$ | $C_{2,2}$ |
|---|---|---|---|---|
| 20 dB | . . . | . . . | . . . | . . . |
| 23 dB | . . . | . . . | . . . | . . . |
| 26 dB | . . . | . . . | . . . | . . . |
| . . . | . . . | . . . | . . . | . . . |

Referring again to step 805 (FIG. 7), appropriate pump power coefficients $C_{i,j}$ are obtained from the lookup table directly or by using extrapolation or other well-known techniques based on the desired gain value calculated in step 804.

Although the embodiments shown and described herein have been directed towards optically amplified systems which use rare earth-doped fiber amplifiers, such as erbium-doped fiber amplifiers, various modifications will be apparent to those skilled in the art which can be useful for applying the inventive principles to other types of optical amplifiers. For example, it is contemplated that the gain control scheme described herein can also be used with semiconductor optical amplifiers with electrical pump arrangements and so on. As is well known, the gain dynamics of semiconductor optical amplifiers are typically faster than those of rare earth doped fiber amplifiers. As such, modifications to account for the faster gain dynamics would be needed. For example, one may include an optical delay element prior to the input of the semiconductor optical amplifier to introduce an appropriate amount of delay so that the gain control circuitry can adjust the gain of the semiconductor optical amplifier with proper timing. Also, the input power monitor, e.g., photodetector 240 (FIG. 2), and the control circuit, e.g., control element 220 (FIG.4), need to be designed to achieve proper timing for the even shorter time constraints of such a device. Another consideration for implementing fast gain control for semiconductor optical amplifiers is that pump control via electrical pump injection schemes are faster than those for fiber amplifiers. In sum, adjustments would be needed to account for the different time constraints when using semiconductor optical amplifiers.

Also, the foregoing embodiments have been shown and described herein as using forward pumping arrangements (e.g., co-propagating) for the optical amplifiers. However, it is contemplated that other pumping arrangements may also be used in conjunction with the gain control scheme according to the principles of the invention. For example, a backward pumping arrangement or even a hybrid arrangement may be used wherein the first amplifier stage is forward pumped while the second amplifier stage is backward pumped (e.g., counter-propagating). It will be appreciated by those skilled in the art that, if counter-propagating pumping is employed (i.e., pump light is injected in a direction opposite to that of the signal light), then other considerations may need to be taken into account. For example, fast gain control is achieved in the present invention whereby gain of the optical amplifier is changed as the input power changes (e.g., within a microsecond) and before amplification of the input signal. This is accomplished using the feed-forward control scheme. Consequently, forward pumping of the optical amplifier, at least the first amplifier stage, complements this feed-forward based gain control scheme.

By comparison, modifications to the gain control scheme may be needed to compensate for the fact that in a backward-pumped fiber optical amplifier, signal and pump light are penetrating the erbium doped fiber starting from opposite ends. Furthermore, additional modifications to the control circuitry and/or optical delay elements at the input of the amplifier may be needed to account for the delays associated with the propagation of the pump light in the reverse direction (from output to input) through the length of erbium-doped fiber.

As described herein, aspects of the present invention can be embodied in the form of methods and apparatuses for practicing those methods. Aspects of the invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. Aspects of the present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should also be noted that the foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown. The functions of various elements shown in the drawing may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the drawing are conceptual only. Their function may be carried out through the operation of program logic, through dedicated logic, through the interaction of program control and dedicated logic, or even manually, the particular technique being selectable by the implementor as more specifically understood from the context.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

What is claimed is:

1. An arrangement for controlling the gain of an optical amplifier coupled to an optical fiber in a wavelength division multiplexed (WDM) system, the optical amplifier coupled to a pump source and capable of amplifying a WDM signal having a plurality of optical channels, the arrangement comprising:

a feed-forward monitoring path, coupled to the optical fiber at a position upstream from an input of the optical amplifier, for measuring input power to the optical amplifier; and a control circuit, responsive to the measured input power, for controlling an amount of pump power supplied by the pump source to the optical amplifier, the amount of pump power for effecting gain control being a function of a scaled relationship to the measured input power, the scaled relationship being derived using a first coefficient representative of a direct offset value to the pump power and a second coefficient representative of a slope factor corresponding to a predetermined relationship between the pump power and the measured input power, whereby per-channel gain in the amplified WDM signal is maintained so that power excursions in one or more of the optical channels being amplified are substantially limited in the presence of changes in input power to the optical amplifier.

2. The arrangement according to claim 1, wherein the feed-forward monitoring path includes:

an optical coupler for tapping off a portion of optical signal power of the WDM signal, the tapped portion representative of input power to the optical amplifier, and a photodetector capable of detecting and measuring the input power.

3. The arrangement according to claim 2, further comprising an optical delay element coupled between the optical coupler an the optical amplifier input.

4. The arrangement according to claim 1, wherein changes in input power occur as a result of adding/dropping optical channels in the WDM signal.

5. The arrangement according to claim 1, wherein gain of the optical amplifier is controlled within approximately a sub-microsecond time scale from the time that a change in the input power is detected.

6. The arrangement according to claim 1, wherein gain of the optical amplifier is controlled before changes in input power reach a gain medium of the optical amplifier.

7. The arrangement according to claim 1, wherein the optical amplifier is a semiconductor optical amplifier.

8. The arrangement according to claim 1, wherein the scaled relationship is defined as $P_{PUMP}=C_1+(C_2 \times P_{IN})$, wherein $P_{PUMP}$ is the pump power, $P_{IN}$ is the measured input power, $C_1$ is the first coefficient, and $C_2$ is the second coefficient.

9. The arrangement according to claim 8, further comprising the step of selecting values for the first coefficient $C_1$ and the second coefficient $C_2$ to compensate for effects selected from the group consisting of pump source wavelength shift, wavelength-dependent optical amplifier efficiency, and noise contribution for a low input power condition.

10. The arrangement according to claim 8, wherein the first coefficient $C_1$ is a dominant coefficient for offsetting the pump power at relatively lower $P_{IN}$ levels, and wherein $C_2$ is a dominant coefficient for offsetting the pump power at relatively higher $P_{IN}$ levels.

11. The arrangement according to claim 8, wherein the optical amplifier is an erbium-doped fiber optical amplifier.

12. The arrangement according to claim 11, wherein the erbium-doped fiber optical amplifier comprises a first amplifier stage and a second amplifier stage, and wherein the pump source includes a first pump laser coupled to the first amplifier stage and a second pump laser coupled to the second amplifier stage, and wherein at least the first amplifier stage is pumped in a co-propagating pump arrangement.

13. The arrangement according to claim 12, wherein each of the first and second amplifier stages has a corresponding first and second coefficient.

14. An arrangement for controlling the gain of an optical amplifier coupled to an optical fiber in a wavelength division multiplexed (WDM) system, the optical amplifier coupled to a pump source and capable of amplifying a WDM signal having a plurality of optical channels, the arrangement comprising:

a feed-forward monitoring path, coupled to the optical fiber at a position upstream from an input of the optical amplifier, for measuring input power to the optical amplifier; and a control circuit, responsive to the measured input power, for controlling an amount of pump power supplied by the pump source to the optical amplifier, the amount of pump power for effecting gain control being a function of a scaled relationship to the measured input power, wherein the scaled relationship is defined as $P_{PUMP}=C_1+(C_2 \times P_{IN})$, wherein $P_{PUMP}$ is the pump power, $P_{IN}$ is the measured input power, $C_1$ is a first coefficient representative of a direct offset value to the pump power, and $C_2$ is a second coefficient representative of a slope factor corresponding to a predetermined relationship between $P_{PUMP}$ and $P_{IN}$, wherein the control circuit is a hardware-implemented control circuit comprising a multiplier circuit for multiplying the measured input power by the second coefficient to produce a first output, and an adder circuit for adding the first output to the first coefficient to produce a second output, wherein the second output establishes a drive current for controlling the amount of pump power being supplied by the pump source, and whereby per-channel gain in the amplified WDM signal is maintained so that power excursions in one or more of the optical channels being amplified are substantially limited in the presence of changes in input power to the optical amplifier.

15. The arrangement according to claim 8, further comprising:

a feedback monitoring loop, coupled to the optical fiber at a position downstream from an output of the optical amplifier, for measuring total output power from the optical amplifier and for determining the number of optical channels present at the output of the optical amplifier, the number of channels being representative of a surviving channel count; and a microprocessor for updating the first and second coefficients based on the measured input power, the measured total output power, and the surviving channel count.

16. The arrangement according to claim 15, wherein the feedback monitoring loop is further operable to measure noise power.

17. The arrangement according to claim 15, wherein the feedback monitoring loop comprises:

an optical coupler for tapping off a portion of optical signal power of the amplified WDM signal, the tapped portion representative of total output power from the optical amplifier;

a photodetector for detecting and measuring the total output power; and an optical monitor for determining the surviving channel count.

18. A method of controlling the gain of an optical amplifier coupled to an optical fiber in a wavelength division multiplexed (WDM) system, the optical amplifier coupled to a pump source and capable of amplifying a WDM signal having a plurality of optical channels, the method comprising:

measuring input power to the optical amplifier; and responsive to the measured input power, controlling an amount of pump power supplied by the pump source to the optical amplifier, the amount of pump power for effecting gain control being a function of a scaled relationship to the measured input power, the scaled relationship being derived using a first coefficient representative of a direct offset value to the pump power and a second coefficient representative of a slope factor corresponding to a predetermined relationship between the pump power and the measured input power, whereby per-channel gain in the amplified WDM signal is maintained so that power excursions in one or more of the optical channels being amplified are substantially limited in the presence of changes in input power to the optical amplifier.

19. The method according to claim 18, wherein gain of the optical amplifier is controlled within approximately a sub-microsecond time scale from the time that a change in the input power is detected.

20. The method according to claim 18, wherein gain of the optical amplifier is controlled before changes in input power reach a gain medium of the optical amplifier.

21. The method according to claim 18, further comprising the step of determining the amount of pump power according to the scaled relationship by multiplying the measured input power by the second coefficient to produce a first output, and adding the first output with the first coefficient to produce a control output, the control output for establishing a drive current for controlling the amount of pump power being supplied by the pump source.

22. The method according to claim 21, further comprising the steps of:

at a position downstream from an output of the optical amplifier, measuring total output power from the optical amplifier;

determining the number of optical channels present at the output of the optical amplifier, the number of channels being representative of a surviving channel count; and updating the first and second coefficients based on the measured input power, the measured total output power, and the surviving channel count.

23. The method according to claim 22, further comprising the step of determining noise power.

24. The method according to claim 22, wherein the step of updating includes:

calculating a desired total output power based on the surviving channel count;

calculating a desired gain value based on the desired total output power and the measured input power; and deriving updated first and second coefficients based on the desired gain value.

25. The method according to claim 24, further comprising the step of calculating an updated pump power value based on the updated first and second coefficients and the measured input power.

26. The method according to claim 21, further comprising the steps of:

at a position downstream from an output of the optical amplifier, measuring total output power from the optical amplifier;

determining the number of optical channels present at the output of the optical amplifier, the number of channels being representative of a surviving channel count;

calculating a desired total output power based on the surviving channel count;

calculating a desired gain value based on the desired total output power and the measured input power;

deriving updated first and second coefficients based on the desired gain value; and calculating an updated pump power value based on the updated first and second coefficients and the measured input power.

27. A gain-controlled optical amplifier coupled to an optical fiber in a wavelength division multiplexed (WDM) system, the optical amplifier further coupled to a pump source and capable of amplifying a WDM signal having a plurality of optical channels, the optical amplifier comprising:

a feed-forward monitoring path, coupled to the optical fiber at a position upstream from an input of the optical amplifier, for measuring input power to the optical amplifier; and a control circuit, responsive to the measured input power, for controlling an amount of pump power supplied by the pump source to the optical amplifier, the amount of pump power for effecting gain control being a function of a scaled relationship to the measured input power, the scaled relationship being derived using a first coefficient representative of a direct offset value to the pump power and a second coefficient representative of a slope factor corresponding to a predetermined relationship between the pump power and the measured input power, whereby per-channel gain in the amplified WDM signal is maintained so that power excursions in one or more of the optical channels being amplified are substantially limited in the presence of changes in input power to the optical amplifier.

28. The optical amplifier according to claim 27, wherein gain of the optical amplifier is controlled within approximately a sub-microsecond time scale from the time that a change in the input power is detected.

29. The optical amplifier according to claim 27, further comprising a gain medium, wherein gain of the optical amplifier is controlled before changes in input power reach the gain medium.

30. The optical amplifier according to claim 27, wherein the optical amplifier is selected from the group consisting of a semiconductor optical amplifier and an erbium-doped fiber amplifier.

* * * * *